(No Model.)

G. MOFFAT.
RAIL BOND.

No. 605,115.                                Patented June 7, 1898.

WITNESS
P. McComb.
M. G. McClean.

INVENTOR
George Moffat.
BY
Cary Wement
ATTORNEYS

UNITED STATES PATENT OFFICE.

GEORGE MOFFAT, OF NEW YORK, N. Y.

RAIL-BOND.

SPECIFICATION forming part of Letters Patent No. 605,115, dated June 7, 1898.

Application filed February 24, 1898. Serial No. 671,445. (No model.)

*To all whom it may concern:*

Be it known that I, GEORGE MOFFAT, a citizen of the United States, and a resident of New York city, county of New York, and State of New York, have invented certain new and useful Improvements in Rail-Bonds, of which the following is a specification, reference being had to the accompanying drawings, forming a part thereof, in which similar letters of reference indicate corresponding parts.

This invention relates to an improved rail-bond; and the object thereof is to supply an efficient device of this character adapted for securely connecting two adjacent sections of a railway-rail in such a manner as to supply a perfect conductor and at the same time allow for expansion and contraction of the rail-sections.

The device is simple in construction, inexpensive, and durable, and it is applicable for use in connection with any common form or style of rail.

The invention will be hereinafter fully described, and specifically set forth in the annexed claims.

Figure 1:
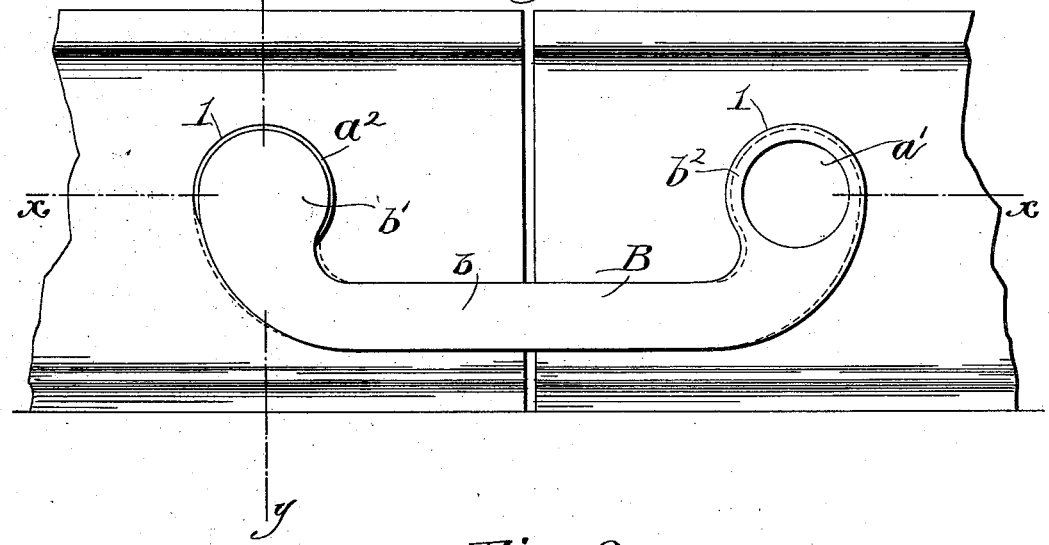
Figure 2:
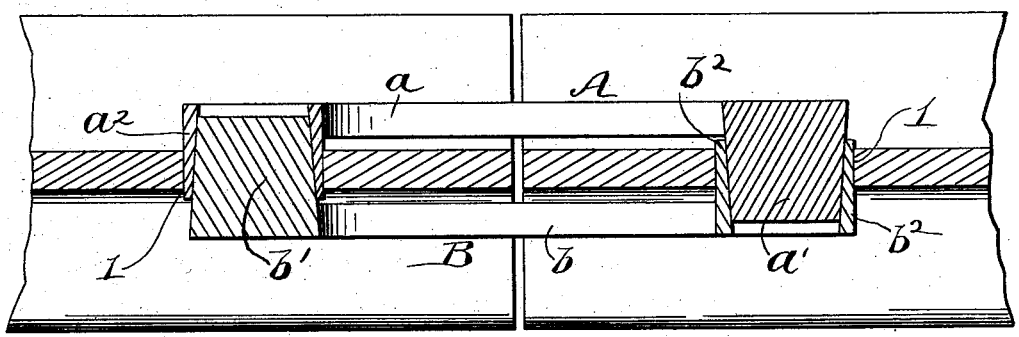
Figure 3:
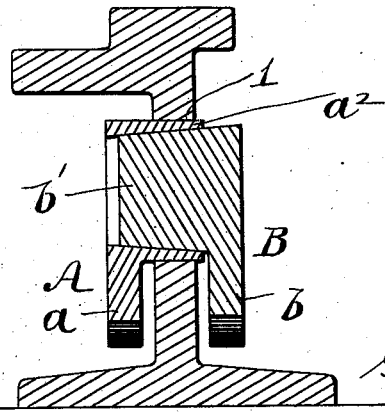

In the accompanying drawings, forming part of this specification, Figure 1 is a side elevation illustrating two adjacent rail-sections connected by means of my improved bond. Fig. 2 is a sectional plan view taken on the line $x\ x$ of Fig. 1, and Fig. 3 is a vertical sectional elevation taken on the line $y\ y$ of Fig. 1.

In the practice of my invention the bond comprises two members A and B, adapted for telescopic connection with each other, as illustrated in the drawings, but normally separated. These two members comprise, respectively, loops $a$ and $b$, each loop having an oppositely-located plug and eye upon the ends thereof, the plugs being of tapering contour and the eyes formed in the shape of a sleeve having a tapering opening. As an illustration, the loop $a$ has a tapering plug $a'$ projected inwardly from the right-hand end thereof and a tapering sleeve or eye $a^2$ projected inwardly from the left-hand end thereof. The oppositely-located loop $b$ has a tapering plug $b'$ projected inwardly from the left-hand end thereof and a tapering sleeve $b^2$ projected inwardly from the right-hand end thereof, whereby the tapering plug $a'$ of the member A engages the sleeve $b^2$ of the member B and the tapering plug $b'$ engages the tapering sleeve $a^2$ of the member A, thus securely connecting the said members, as illustrated in the drawings.

In connecting the bond to the adjacent sections of the rail each section of the rail, through the stem thereof, is provided with a circular opening of a diameter equaling the diameter of the sleeves $a^2$ and $b^2$ forming part of the bond, whereby when the same is connected and the tapering plugs thereof are tightly wedged within the sleeves a slight expansion of the said sleeves resulting from the wedge action of the plugs will make and maintain a secure contact with the rail-section without the necessity of using bolts or other fastenings.

The bonds are preferably composed of copper, the several parts of the two members being formed integral with each other, whereby the loops $a$ and $b$ will act as springs to allow for expansion and contraction of the rail-section.

Having thus described my said invention, what I claim as new, and desire to secure by Letters Patent, is—

1. A rail-bond comprising two telescopically-connected members, the said members adapted for engagement with openings in adjacent rail-sections, substantially as shown and described.

2. A rail-bond comprising two members composed of metallic loops having projections and recesses upon their respective ends, the said projections and recesses arranged opposite to each other, whereby they may be telescopically connected for engagement with apertures in two adjacent sections of a railway-rail, substantially as shown and described.

3. A rail-bond comprising two metallic loops, each loop having a tapering plug on one end thereof, and a tapering sleeve upon the other, the plugs and sleeves of the oppositely-arranged loops adapted for telescopic engagement with each other, and the sleeves adapted to respectively pass through openings in adjacent rail-sections for the purpose of connecting said sections to each other, substantially as shown and described.

4. As a rail-bond, a combination of two loops arranged parallel with each other, each loop being supplied upon its respective ends with a plug of tapering contour and a sleeve with a tapering opening, the said sleeves and plugs engaging telescopically with each other; with adjacent sections of a railway-rail, said sections having apertures leading therethrough engaging the sleeves of the rail-bond, substantially as shown and described.

In testimony that I claim the foregoing as my invention I have signed my name, in presence of two witnesses, this 19th day of February, 1898.

GEORGE MOFFAT.

Witnesses:
B. McComb,
M. G. McClean.